United States Patent [19]

Cailloux

[11] 4,076,967
[45] Feb. 28, 1978

[54] TRUNKING PROCEDURE AND ARRANGEMENT FOR THE CONNECTION OF FUNCTIONAL UNITS

[75] Inventor: Philippe Cailloux, Antony, France

[73] Assignee: Compagnie Industrielle des Telecommunications Cit-Alcatel S. A., Paris, France

[21] Appl. No.: 747,852

[22] Filed: Dec. 6, 1976

[30] Foreign Application Priority Data

Dec. 31, 1975 France .................................. 75 40326

[51] Int. Cl.² ............................................. H04Q 3/06
[52] U.S. Cl. ................................. 179/18 AG; 179/98; 340/147 G
[58] Field of Search ............... 179/98, 18 AG, 27 CA; 340/147 G

[56] References Cited

U.S. PATENT DOCUMENTS 3,513,263  5/1970  Bastian et al. .................. 179/27 CA
3,943,299  3/1976  Moriyama et al. ..................... 179/98

FOREIGN PATENT DOCUMENTS 1,196,718  7/1965  Germany ......................... 179/18 AG Primary Examiner—Thomas A. Robinson
Attorney, Agent, or Firm—Sughrue, Rothwell, Mion, Zinn and Macpeak

[57] ABSTRACT

The invention concerns the connection of functional units. A trunking arrangement is disclosed which permits the linking of minority units of the same type in several blocks of units, to other units allocated to that type and grouped in a single block of units. The minority connections from minority units of distinct types, are grouped into relaying links and relayed by said links to a wiring structure, which reassembles the connections pertaining to units of one and the same type in regrouping links. Application of the invention is in the field of telecommunications.

7 Claims, 1 Drawing Figure

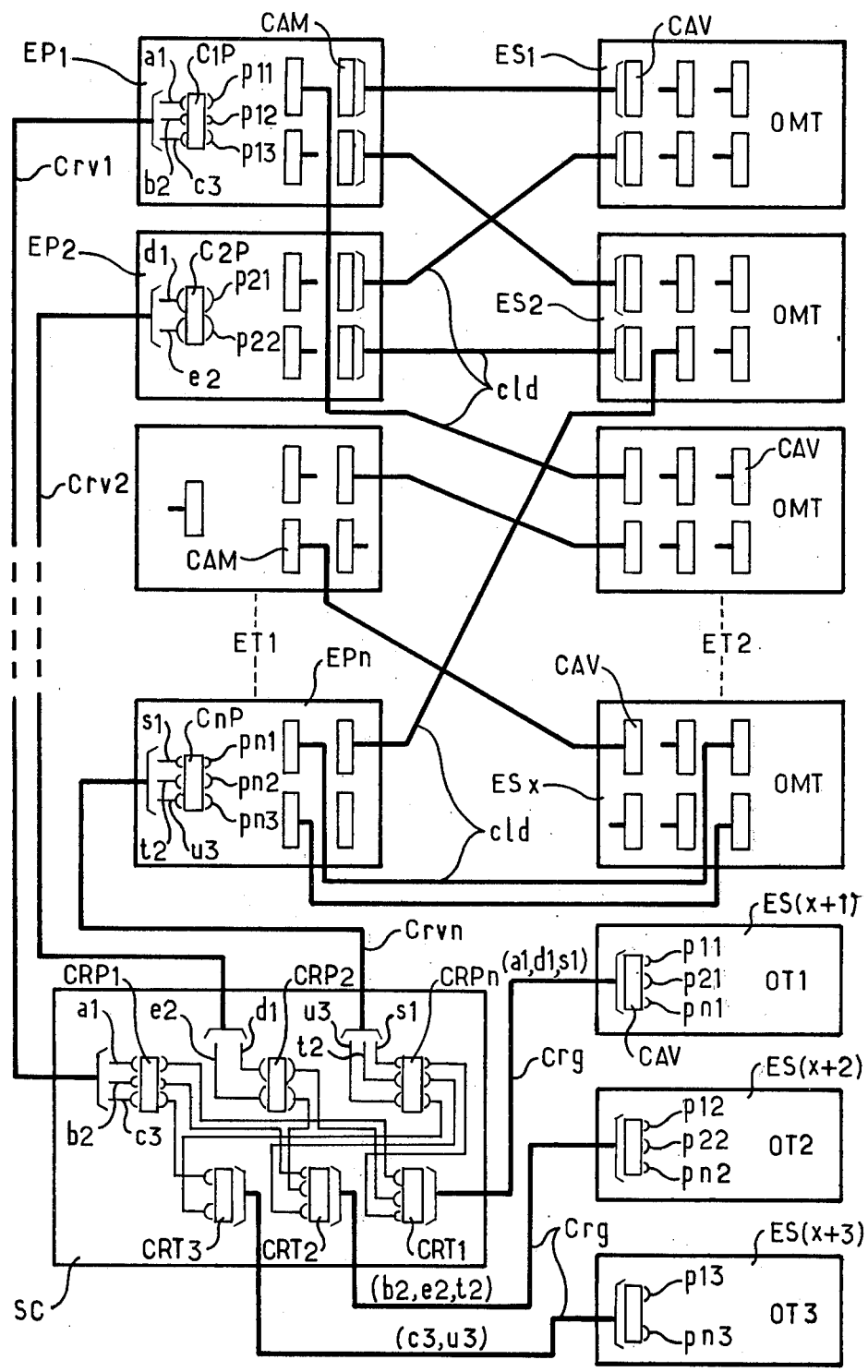

TRUNKING PROCEDURE AND ARRANGEMENT FOR THE CONNECTION OF FUNCTIONAL UNITS

The present invention is a trunking method and arrangement for the connection of functional units, and in particular of switching units equipping a telecommunications exchange.

In creating the configuration of the switching network's selection field in a telephone exchange, it is necessary to establish connections between large numbers of similar units grouped in "blocks" equipping separate stages, such as the verticals and horizontals of switches or relay switching matrixes. As a rule, such connections are made with standard cords, equipped at each end with plug-in connectors, and all wires in said cords are used.

It is possible for each such block in a stage to comprise a small set of units of different types, connected to the next stage in subsets according to type, whereby the connection points of the subsets in each block in a first stage are linked, in aggregates per type, to one block per type in a second stage. Up to the present, this allocation has been performed by two possible trunking arrangements, each involving certain disadvantages:

in the first possible trunking arrangement, the minority units of the same type in each block of units of a stage, are directly connected by cords with plug-in connectors to the units with which they are to be associated in the next stage : this arrangement involves the disadvantage of requiring a large number of reduced-capacity, non-uniform cords.

in the second possible trunking arrangement, the connection points of minority units of the same type are wired in groups to connection terminal blocks, from which high-capacity cords lead to similar grouping terminal blocks wired to the associated units in the next stage: this arrangement has the advantage of reducing the number and disparity of inter-stage trunking cords, but the disadvantage of demanding manual connection on the installation site of the cord conductors to the terminal block pins.

Preferred embodiments of the invention provide a rational trunking arrangement for the connection of minority units of the same type in several blocks with other units allocated to said types of unit, and concentrated in a single connection block per type, said rational trunking arrangement doing away with the non-uniformity and large number of different kinds of trunking cords while permitting automatic or semi-automatic wiring of connectors which can be mated with standard plug-in cords.

The present invention provides a method of providing connections between blocks in a structure which comprises at least two stages, each stage comprising a plurality of blocks and each block comprising a plurality of functional units of differing types; the method comprising:

devising a pattern of connection points for each block including connections to differrent ones of the functional units of a block, like blocks having like patterns;

relaying connection points of like patterns in one stage to respective first connection point patterns of regrouping means for that stage;

So regrouping the connection points of said first patterns into second connection point patterns of the regrouping means that each second connection point pattern is constituted by connection points all pertaining to one kind of functional unit; and forming single-function inter-stage links from said second patterns to an adjacent stage of the structure.

The present invention also provides an arrangement of connections between blocks in a structure which comprises at least two stages, each stage comprising a plurality of blocks and each block comprising a plurality of functional units of different types; the arrangement comprising: direct inter-stage connection between majority functional units of two adjacent stages via direct trunks of standardised capacity and indirect inter-stage connection of minority functional units via regrouping means having first connections to different blocks of a stage including connections pertaining to minority functional units of different types and second connections regrouping the first connections by functional type of minority unit and connected via direct trunks of the standardised capacity blocks of an adjacent stage specific to the respective types of functional unit whereby the stage-spanning portion of the inter-stage connections of minority functional units are provided by standardised trunks.

Preferably the connection points of the minority functional units form an arrangement wherein the connection points of the minority functional units of each block are brought together in a predetermined pattern at a multifunction connector, the said pattern being relayed to a corresponding multi-function connector constituting part of the first connections of the regrouping means. The connections pertaining to each functional unit may be arranged in subsets and the connections juxtaposed by subsets in the connectors.

The multi-function connections may be by plug-in cords which are preferably of the same type as is used for the single function interstage connections.

An embodiment of the invention is described by way of example with reference to the single FIGURE of the accompanying drawing which is a block diagram of the interconnections between two stages of switching equipment and within the stages themselves.

The figure represents : $n$ blocks EP1 - EP2 . . . EP$n$ in a first stage ET1, each comprising a majority of functional units of the same type and a minority of functional units of different types, and $x$ blocks ES1 - ES2 . . . ES$x$ in a second stage ET2, comprising functional units of the same type only, plus three blocks ES $(x+1)$, ES $(x+2)$, and ES $(x+3)$ pertaining to said second stage ET2, and respectively comprising only functional units of type 1 (OT1), type 2 (OT2) and type 3 (OT3).

The majority of functional units of identical type in the $n$ first stage blocks EP1 . . . EP$n$ are directly trunked according to a grading scheme, by cords $cld$ to functional units of the same type in the $x$ second stage blocks (ES1 - ES$x$). Said cords $cld$ being terminally equipped to plug into connectors of identical type CAM on the ET1 side, and connectors of identical type CAV on the ET2 side.

For example, the majority functional units of identical type in the blocks in stage ET1 may be crossbar switch verticals, and the functional units of identical type in stage ET2 may be crossbar switch horizontals, the first stage verticals being connected to the second stage horizontals by stage connectors CAM, CAV and their direct trunking cords $cld$, which then constitute the links of a link system.

Also, "majority functional units of identical type equipping blocks" may refer to switching relays in matrix configurations on printed circuit boards, the crosspoints of said matrixes being formed by said relays' contacts of which the coordinates are determined by "line-column" conductors in orthogonal arrangements, coordinates said printed circuit boards being grouped in blocks, each block occupying a structure referred to as a "location" or "nest", for example.

Functional units are *minority* functional units when their number in a block of functional units, or per type of functional unit in a block, is clearly less than the connection capacity of a direct trunking connector.

The minority functional units of various types in blocks EP1 - EP2 ... EPn are connected in subsets of identical type to a "subset connector" C1P, C2P, CnP per block EP1 - EP2 ... EPn.

Subset connectors C1P, C2P ... CnP are of identical type and analogous to the connectors CAM and CAV. Each block may comprise the same or a different quantity of various types of minority functional units, wired to its subset connector, and each set of wires (wire-set) attached to a subset connector is attached to pins in an allocated part of said connector, the connection capability of that part being a function of the number of functional units comprised in that subset.

Thus, for example, quantity "a" minority functional units of type 1 (wire-set $a1$) are connected to the pins of part $p11$ of subset connector C1P ; quantity "b" minority functional units of type 2 (wire-set $b2$) are similarly connected to pins in part $p12$ of the same subset connector, and quantity "c" minority functional units of type 3 are similarly connected (wire-set $c3$) to the pins in part $p13$ of that subset connector.

The minority functional units equipping the crossbar switching groups or relay switching matrixes are for example the level or relay line controls, the vertical coil contact or relay matrix contact readers, supervisory and monitoring units, and so forth.

Subset connectors C1P, C2P, ... CnP are connected to a wiring structure SC comprising a subset relaying connector *per block* CRP1, CPR2, and a grouping connector *per type of minority unit* CRT1, CRT2, CRT3, said relaying and regrouping connectors being of a standard type analogous to that of the subset connectors and that of the direct trunking connectors CAM and CAV.

Wire-sets $a$, $b$, $c$, connecting subsets types 1, 2, and 3 to respective portions $p11$, $p12$, $p13$ of subset connector C1P are extended on wire-groups $a1$, $a2$, $a3$ in link cord $Crv1$ to corresponding portions of subset relaying connector CRP1 in wiring structure SC.

Similarly, wire-sets $d$ and $e$ connecting subsets types 1 and 2 to portions $p21$ and $p22$ respectively of subset connector C2P are extended on wire-groups $d1$ and $d2$ respectively in link cord $Crv2$ to corresponding portions (pin-fields) of subset relaying connector CRP2.

And again similarily, wire-sets $s$, $t$, and $u$ connecting subsets type 1, 2 and 3 respectively to portions $pn1$, $pn2$, $pn3$ of subset connector CnP, are extended on wire-groups $s1$, $t1$, $u1$ in link cord $Crvn$ to corresponding portions of subset relaying connector CRPn.

The portion corresponding to $p11, p21, ... pn1$ of said subset relaying connectors are all extended by said subset relaying connectors to a single regrouping-by-type connector CRT1 allocated to subsets type 1, said regrouping connector's pins connecting to wire-groups in a link cord, for matching pin-to-pin connection with a second-stage connector CAV pertaining to a second-stage (ET2) block ES $(x+1)$.

In consequence, block ES $(x+1)$ groups all subset type 1 connections from stage ET1 on its connector CAV, namely the wire-groups $a1$, $d1$, $s1$ from ET1 blocks EP1, EP2, EPn in respective portions $p11$, $p21$, $pn1$ of its connector CAV.

Similarly, block ES $(x+2)$ groups all subset type 2 connections from stage ET1 on its connector CAV, namely the wire-groups $b2$, $e2$, $t2$ from ET1 blocks EP1, EP2, ... EPn in respective portions $p12$, $p22$, $pn2$ of its connector CAV.

Again similarily, block ES $(x+3)$ groups all subset type 3 connections on its connector CAV, namely the wire-groups $c3$, $u3$ in respective portions (or pin-fields) $p13 ... pn3$ of its connector CAV.

It is of course understood that the number of ES block, namely ES $(x+1)$ to ES $(x+3)$, is not limited to three or any other quantity.

The example illustrated in the figure does not show the relaying and retrunking connections originating at the minority functional units in stage ET2. It is understood that connections similar to the scheme described can be made to retrunk said minority units of various types in stage ET2 towards blocks in stage ET1 on the type-to-block basis.

The numbers of majority function blocks $u$ and $x$ in the two stages may be equal or unequal with either stage having more according to design requirements.

What we claim is:

1. A trunking method of providing connections between blocks in a telecommunications exchange structure having at least two stages, each stage comprising a plurality of blocks and each block comprising a plurality of functional units of differing types; the method comprising:

defining a first pattern of connection points for each block, said first pattern including connections to different functional units of each block, wherein the patterns for like blocks are identical;

relaying connection points of identical patterns for said like blocks in one stage to a set of respective first connection point patterns for said one stage;

regrouping the first set of connection point patterns of said first patterns into a second set of connection point patterns wherein each second set of connection point patterns is defined by connection points all pertaining to one kind of functional unit; and forming single-function inter-stage links from said second set of connection point patterns to an adjacent stage of the structure.

2. A trunking system of connections between blocks in a telecommunications exchange structure having at least two stages, each stage comprising a plurality of blocks and each block comprising a plurality of functional units of a majority type and a minority type, comprising: direct trunk connections of standardized capacity providing direct inter-stage connection between majority functional units of two adjacent stages, regrouping means for indirect inter-stage connection of minority functional units, said regrouping means having first connections including a multi-function connector to different blocks of a stage including connections pertaining to minority functional units of different types and second connections regrouping the first connections by functional type of minority unit and connected via said direct trunk connections of standardized capacity by stage-spanning portions to blocks of an adjacent stage specific to the respective types of functional unit, whereby the stage-spanning portion of the innerstage connections of minority functional units are provided by standardized trunks.

3. An arrangement according to claim 2 further including a multi-function connector wherein the connection points of said minority functional units of each block are brought together in a predetermined pattern at said multi-function connector, said predetermined pattern being relayed to said corresponding multi-function connector constituting part of the first connections of the regrouping means.

4. An arrangement according to claim 3, wherein the connections pertaining to each functional unit are arranged in subsets and the connections are juxtaposed by subsets in the connectors.

5. An arrangement according to claim 3 wherein the multi-function connectors are interconnected by plug-in cords.

6. An arrangement according to claim 5, wherein the plug-in cords are of a single standardized type identical to the type used for inter-stage connection.

7. An arrangement according to claim 6 wherein each block comprises a nest of printed circuit boards and the regrouping means comprises a nest of printed circuit boards.

* * * * *